(12) United States Patent
Lobacheva et al.

(10) Patent No.: US 11,568,237 B2
(45) Date of Patent: Jan. 31, 2023

(54) ELECTRONIC APPARATUS FOR COMPRESSING RECURRENT NEURAL NETWORK AND METHOD THEREOF

(71) Applicant: Samsung Electronics Co., Ltd., Suwon-si (KR)

(72) Inventors: Ekaterina Maksimovna Lobacheva, Moscow (RU); Nadezhda Aleksandrovna Chirkova, Moscow (RU); Dmitry Petrovich Vetrov, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 936 days.

(21) Appl. No.: 16/409,169

(22) Filed: May 10, 2019

(65) Prior Publication Data

US 2019/0347551 A1 Nov. 14, 2019

(30) Foreign Application Priority Data

| May 10, 2018 | (RU) | ............................ RU2018117359 |
| Oct. 15, 2018 | (RU) | ............................ RU2018136250 |
| Mar. 20, 2019 | (KR) | ........................ 10-2019-0031618 |

(51) Int. Cl.
*G06F 16/00* (2019.01)
*G06N 3/08* (2006.01)
*G06F 17/11* (2006.01)

(52) U.S. Cl.
CPC .............. *G06N 3/08* (2013.01); *G06F 17/11* (2013.01)

(58) Field of Classification Search
None
See application file for complete search history.

(56) References Cited

U.S. PATENT DOCUMENTS

| 7,287,014 | B2 | 10/2007 | Chen et al. |
| 9,129,222 | B2 | 9/2015 | Aparin |
| 10,305,766 | B1 * | 5/2019 | Zhang ................ G08B 21/0484 |
| 2012/0330870 | A1 | 12/2012 | Aparin |
| 2017/0076196 | A1 | 3/2017 | Sainath et al. |
| 2017/0127016 | A1 | 5/2017 | Yu et al. |
| 2018/0005107 | A1 | 1/2018 | Neil et al. |

(Continued)

FOREIGN PATENT DOCUMENTS

| EP | 3 179 415 A1 | 6/2017 |
| RU | 2 586 864 C2 | 6/2016 |
| WO | 2016/049757 A1 | 4/2016 |

(Continued)

OTHER PUBLICATIONS

Russian Office Action dated Jul. 11, 2019, issued in Russian Patent Application No. 2018136250.

(Continued)

*Primary Examiner* — Anhtai V Tran
(74) *Attorney, Agent, or Firm* — Jefferson IP Law, LLP

(57) ABSTRACT

An electronic apparatus for compressing a recurrent neural network and a method thereof are provided. The electronic apparatus and the method thereof include a sparsification technique for the recurrent neural network, obtaining first to third multiplicative variables to learn the recurrent neural network, and performing sparsification for the recurrent neural network to compress the recurrent neural network.

20 Claims, 5 Drawing Sheets

(56) References Cited

U.S. PATENT DOCUMENTS

2018/0046914 A1 2/2018 Li et al.
2018/0174036 A1 6/2018 Han et al.

FOREIGN PATENT DOCUMENTS

WO 2016145379 A1 9/2016
WO 2017/151757 A1 9/2017

OTHER PUBLICATIONS

Russian Decision on Grant dated Aug. 28, 2019, issued in Russian Patent Application No. 2018136250.
Dario Amodei, Sundaram Ananthanarayanan, Rishita Anubhai et al.; "Deep speech 2: End-to-end speech recognition in english and mandarin"; In Proceedings of The 33rd International Conference on Machine Learning, Baidu Research—Silicon Valley AI Lab; Dec. 8, 2015; arXiv: 1512.02595v1.
Yuxiong Wei Wen, Minjia Samyam Rajbhandari; Wang Wenhan, Bin Fang Liu, Yiran Chen Hu, and Li Hai; "Learning intrinsic sparse structures within long short-term memory"; In International Conference on Learning Representations; Feb. 11, 2018; arXiv:1709.05027v7.
William Chan, Navdeep Jaitly, Quoc V. Le, and Oriol Vinyals. "Listen, attend and spell: A neural network for large vocabulary conversational speech recognition". In ICASSP; Aug. 20, 2015; arXiv:1508.01211v2.
Christos Louizos, Karen Ullrich, and Max Welling; "Bayesian compression for deep learning". In arXiv preprint; Nov. 6, 2017; arXiv:1705.08665.
Meire Fortunato; Charles Blundell and Oril Vinyals; "Bayesian recurrent neural networks", Computing Research Repository, Mar. 21, 2018; arXiv:1704.02798.
Yarin Gal and Zoubin Ghahramani; "Dropout as a bayesian approximation: Representing model uncertainty in deep learning". In Proceedings of the 33rd International Conference on International Conference on Machine Learning, University of Cambridge; 2016.
Yarin Gal and Zoubin Ghahramani; "A theoretically grounded application of dropout in recurrent neural networks". In Advances in Neural Information Processing Systems 29 (NIPS), University of Cambridge; 2016.
David Ha, Andrew Dai; and Quoc V. Le; "Hypernetworks", In Proceedings of the International Conference on Learning Representations (ICLR), Dec. 1, 2016;arXiv:1609.09106v4.
Andrew L. Mass, Raymond E. Daly, Peter T. Pham, Dan Huang, Andrew Y. Ng, and Christopher Potts Learning word vectors for sentiment analysis; In Proceedings of the 49th Annual Meeting of the Association for Computational Linguistics: Human Language Technologies—vol. 1, HLT'11, pp. 142-150, Portland, Oregon, Jun. 19-24, 2011; Association for Computational Linguistics.
Diederik P. Kingma and Jimmy Lei Ba; "A method for stochastic optimization"; In Proceedings of the 3rd International Conference for Learning Representations, Jan. 30, 2017; arXiv:1412.6980v9.
Diederik P. Kingma and Max Welling; "Auto-encoding variational bayes"; CoRR, Machine Learning Group Universiteit van Amsterdam; May 1, 2014; arXiv:1312.6114v10.
Kirill Neklyudov, Dmitry Molchanov, Aresenii Ashukha, and Dmitry Vetrov; "Structured bayesian pruning via log-normal multiplicative noise", In 31st Conference on Neural Information Processing Systems (NIPS 2017), arXiv preprint; Nov. 4, 2017; arXiv:1705.07283v2.
Quoc V. Le, Navdeep Jaitly, and Geoffrey E. Hinton; "A simple way to initialize recurrent networks of rectified linear units"; CoRR, abs/1504.00941, Apr. 7, 2015.
Dmitry Molchanov, Arsenii Ashukha and Dmitry Vetrov; "Variational dropout sparsifies deep neural networks"; In Proceedings of the 34th International Conference on Machine Learning, ICML 2017, Jun. 13, 2017; arXiv:1701.05369v3.
Mitchell Marcus, Beatrice Santorini and Mary Ann Marcinkiewicz; "Building a large annotated corpus of English"; The penn treebank. Comput. Linguist., 19(2):pp. 313-330; Oct. 1993.
Sharan Narang, Erich Elsen, Greg Diamos and Shubho Sengupta; "Exploring sparsity in recurrent neural networks" CoRR, Baidu Research; abs/1704.05119, Nov. 6, 2017.
Tomas Mikolov, Stefan Kombrink, Lukas Burget, Jan "Honza" Cernocky, and Sanjeev Khudanpur; "Extensions of recurrent neural network language model"; In 2011 IEEE International Conference on Acoustics, Speech and Signal Processing (ICASSP), May 25, 2011.
Mengye Ren, Ryan Kiros, and Richard S. Zemel; "Exploring models and data for image question answering" In Advances in Neural Information Processing Systems 28: Annual Conference on Neural Information Processing Systems, University of Toronto Canadian Institute for Advanced Research; 2015.
Nitish Srivastava; "Improving neural networks with dropout"; PhD thesis, University of Toronto, 2013.
Andros Jandra; Sakriani Sakti, and Satoshi Nakamura; "Compressing recurrent neural network with tensor train"; CoRR, arXiv:1705.08052v1; May 23, 2017.
Sida I. Wang and Christopher D. Manning; "Fast dropout training"; In Proceedings of the 30th International Conference on Machine Learning, Department of Computer Science, Stanford University, Stanford, CA 94305; 2013.
Younghui Wu, Mike Schuster, Zhifeng Chen, Quoc V. Le, and Mohammad Norouzi et al; "Google's neural machine translation system"; Bridging the gap between human and machine translation. CoRR, arXiv:1609.08144v2, Oct. 8, 2016.
Justin Bayer, Christian Osendorfer, Daniela Korhammer, Nutan Chen, Sebastian Urban, and Atrick Van Der Smagt; "On fast dropout and its applicability to recurrent networks"; CoRR, Lehrstuhl für Robotik und Echtzeitsysteme Fakultät für Informatik Technische Universität München; arXiv:1311.0701v7, Mar. 5, 2014.
Gao Huang, Yu Sun, Zhuang Liu, Daniel Sedra, and Kilian Q. Weinberger; Deep networks with stochastic depth:; In ECCV (4), vol. 9908 of Lecture Notes in Computer Science, arXiv:1603.09382v3; Springer, Jul. 28, 2016.
Itay Hubara, Matthieu Courbariaux, Daniel Soudry, Ran El-Yaniv, and Yoshua Bengio "Quantized neural networks:Training neural networks with low precision weights and activations"; arXiv e-prints, Journal of Machine Learning Research; Sep. 2016.
David Krueger, Tegan Maharaj, Janos Kramar, Mohammad Pezeshki, Nicolas Ballas, Nan Rosemary Kr, Anirudh Goyal, Yoshua Bengio, Aaron Courville, and Christopher Pal; "Zoneout: Regularizing mns by randomly preserving hidden activations"; CoRR, arXiv:1606.01305v4, Sep. 22, 2016.
Taesup Moon, Heeyoul Choi, Hoshik Lee, and Inchil Song "Rnndrop: A novel dropout for mns in asr" In Automatic Speech Recognition and Understanding (ASRU), Daegu Gyeongbuk Institute of Science and Technology (DGIST) 333 Techno Jungang-daero , Hyeonpung-myeon, Dalseong-gun, Daegu, 711-873, South Korea and Samsung Advanced Institute of Technology, Samsung Electronics 130 Samsung-ro, Suwon, 443-803, South Korea 2015.
Bo Pang and Lillian Lee; "Seeing stars: Exploiting class relationships for sentiment categorization with respect to rating scales"; In Association for Computational Linguistics, Jun. 17, 2005.
Vu Pham, Theodore Bluche, Christopher Kermorvant and Jerome Louradour; "Dropout improves recurrent neural networks for handwriting recognition"; CoRR, A2iA, 39 rue de la Bienfaisance, 75008—Paris—France; SUTD, 20 Dover Drive, Singapore; LIMSI CNRS, Spoken Language Processing Group, Orsay, France arXiv:1312.4569v2, Mar. 10, 2014.
Stanislau Semeniuta, Aliaksei Severyn and Erhardt Barth; "Recurrent dropout without memory loss" In COLING 2016, 26th International Conference on Computational Linguistics, Proceedings of the Conference: Technical Papers, Universität zu Lübeck, Institut für Neuro- und Bioinformatik; Google Research; Aug. 5, 2016.
Theano Development Team; "Theano: A Python framework for fast computation of mathematical expressions" arXiv e-prints, arXiv:1605.02688v1, May 9, 2016.

(56) References Cited

OTHER PUBLICATIONS

Wojciech Zaremba, Iiya Sutskever and Oriol Vinyals; "Recurrent neural network regularization" In arXiv preprint arXiv:1409.2329, Feb. 19, 2015.

Ekaterina Lobacheva, Nadezhda Chirkova and Dmitry Vetrov; "Bayesian Sparsification of Recurrent Neural Networks"; Published in Workshop on Learning to Generate Natural Language, ICML, Jul. 31, 2017; arXiv:1708.00077v1.

Christos Louizos, Laren Ullrich and Max Welling; "Bayesian Compression for Deep Learning"; In 31st Conference on Neural Information Processing Systems (NIPS 2017); University of Amsterdam; [https://papers.nips.cc/paper/6921-bayesian-compression-for-deep-learning.pdf].

Sander Dieleman, Jan Schluter, Colin Raffel and et al. Lasagne: First release 2015; https://github.com/Lasagne/Lasagne/wiki/Lasagne-Citation-(BibTeX).

* cited by examiner

ELECTRONIC APPARATUS FOR COMPRESSING RECURRENT NEURAL NETWORK AND METHOD THEREOF

CROSS-REFERENCE TO RELATED APPLICATION(S)

This application is based on and claims priority under 35 U.S.C. § 119(a) of a Russian patent application number 2018117359, filed on May 10, 2018, and a Russian patent application number 2018136250, filed on Oct. 15, 2018, in the Russian Intellectual Property Office and of a Korean patent application number 10-2019-0031618, filed on Mar. 20, 2019, in the Korean Intellectual Property Office, the disclosure of each of which is incorporated herein by reference in its entirety.

BACKGROUND

1. Field

The disclosure relates to an apparatus and methods consistent with an electronic apparatus for compressing a recurrent neural network (RNN) and a method thereof. More particularly, the disclosure relates to an electronic apparatus for efficiently using a recurrent neural network artificial intelligence model in an electronic apparatus such as a user terminal.

2. Description of Related Art

An artificial intelligence (AI) system is a computer system that implements human-level intelligence, and a system that a machine itself learns, judges, and becomes smart, unlike an existing rule-based smart system. As the artificial intelligence system is used, a recognition rate is improved and users' taste may be understood more accurately, and as a result, the existing rule-based smart system is increasingly being replaced by a deep learning-based artificial intelligence system.

Artificial intelligence technology includes machine learning (deep learning) and elemental technologies that utilize the machine learning.

The machine learning is an algorithm technology that classifies/learns the characteristics of input data by itself, and the element technology is a technology that utilizes machine learning algorithms such as deep learning and the like and includes technical fields such as linguistic understanding, visual understanding, reasoning/prediction, knowledge representation, motion control, and the like.

Various fields in which the artificial intelligence technology is applied are as follows. The linguistic understanding is a technology for recognizing, applying, and processing human's language/characters, and includes natural language processing, machine translation, dialogue system, query response, voice recognition/synthesis, and the like. The visual understanding is a technology for recognizing and processing objects as human vision, and includes objective recognition, object tracking, image search, human recognition, scene understanding, spatial understanding, image enhancement, and the like.

In recent, a language modeling work (a modeling work for performing the natural language processing, the voice recognition, the query response, and the like) is performed by using an artificial intelligence model using a recurrent neural network.

A conventional recurrent neural network model requires a lot of learning time and large storage space because it uses a large number of parameters. Therefore, a learning of the conventional recurrent neural network model is often performed in an external server capable of having the large storage space and performing high computation, and there is a need to discuss a method for efficiently using a recurrent neural network artificial intelligence model in a portable apparatus having a limited memory such as a smart phone.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic apparatus for compressing a recurrent neural network using the Bayesian sparsification technique in the recurrent neural network, and a method thereof.

Additional aspects will be set forth in part in the description which follows and, in part, will be apparent from the description, or may be learned by practice of the presented embodiments.

In accordance with an aspect of the disclosure, a method for compressing a recurrent neural network is provided. The method includes obtaining first multiplicative variables for input elements of the recurrent neural network, obtaining second multiplicative variables for an input neuron and a hidden neuron of the recurrent neural network, obtaining a mean and a variance for weights of the recurrent neural network, the first multiplicative variables, and the second multiplicative variables, and performing sparsification for the recurrent neural network based on the mean and the variance, wherein the performing of the sparsification may include: calculating an associated value for performing the sparsification based on the mean and the variance for weights of the recurrent neural network, the first multiplicative variables, and the second multiplicative variables, and setting a weight, a first multiplicative variable, or a second multiplicative variable in which the associated value is smaller than a predetermined value to zero.

The associated value may be a ratio of square of mean to variance.

The predetermined value may be 0.05.

The method may further include based on the recurrent neural network being included a gated structure, obtaining third multiplicative variables for preactivation of gates to make gates and information flow elements of a recurrent layer of the recurrent neural network constant, wherein the obtaining of the mean and the variance may include obtaining a mean and a variance for the weights of the recurrent neural network, the first multiplicative variables, the second multiplicative variables, and the third multiplicative variables.

The gated structure may be implemented by a long-short term memory (LSTM) layer.

The obtaining of the mean and the variance may include: initializing the mean and the variance for the weights, a first group variable, and a second group variable, and obtaining a mean and a variance for the weights, the first group variable and the second group variable by optimizing objectives associated with the mean and the variance of the weights, the first group variable, and the second group variable.

The obtaining of the mean and the variance may further include selecting a mini batch of the objectives, generating the weights, the first group variable, and the second group variable from approximated posterior distribution; forward passing the recurrent neural network by using the mini batch based on the generated weights, first group variable, and second group variable, calculating the objectives and calculating gradients for the objectives, and obtaining the mean and the variance for the weights, the first group variable, and the second group variable based on the calculated gradients.

Here, the weights may be generated by the mini batch, and the first group variable and the second group variable may be generated separately from the objectives.

The input elements may be vocabularies or words.

In accordance with another aspect of the disclosure, an electronic apparatus for compressing a recurrent neural network is provided. The electronic apparatus includes a memory to store one or more instructions, and a processor coupled to the memory, wherein the processor is configured to: obtain first multiplicative variables for input elements of the recurrent neural network, obtain second multiplicative variables for an input neuron and a hidden neuron of the recurrent neural network, obtain a mean and a variance for weights of the recurrent neural network, the first multiplicative variables, and the second multiplicative variables, and perform sparsification for the recurrent neural network based on the mean and the variance.

The processor may calculate an associated value for performing the sparsification based on the mean and the variance for weights of the recurrent neural network, the first multiplicative variables, and the second multiplicative variables, and set a weight, a first multiplicative variable, or a second multiplicative variable in which the associated value is smaller than a predetermined value to zero to perform sparsification.

The associated value may be a ratio of square of mean to variance, and the predetermined value may be 0.05.

When the recurrent neural network includes a gated structure, the processor may obtain third multiplicative variables for preactivation of gates to make the gates and information flow elements of a recurrent layer of the recurrent neural network constant, obtain a mean and a variance for the weights, the first multiplicative variables, the second multiplicative variables, and the third multiplicative variables, and perform sparsification for the recurrent neural network based on the mean and the variance.

The gated structure may be implemented by a long-short term memory (LSTM) layer.

The processor may initialize the mean and the variance for the weights, a first group variable, and a second group variable, and obtain a mean and a variance for the weights, the first group variable and the second group variable by optimizing objectives associated with the mean and the variance of the weights, the first group variable, and the second group variable.

The processor may select a mini batch of the objectives, generate the weights, the first group variable, and the second group variable from approximated posterior distribution, forward pass the recurrent neural network by using the mini batch based on the generated weights, first group variable, and second group variable, calculate the objectives and calculate gradients for the objectives, and obtain the mean and the variance for the weights, the first group variable, and the second group variable based on the calculated gradients.

The weights may be generated by the mini batch, and the first group variable and the second group variable may be generated separately from the objectives.

The input elements may be vocabularies or words.

According to the diverse embodiments of the disclosure as described above, it is possible to accelerate a language modeling work by compressing the recurrent neural network artificial intelligence model using the sparsification technique, and it is possible to perform the language modeling work using the recurrent neural network artificial intelligence model even in the portable apparatus having the limited memory, or the like.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
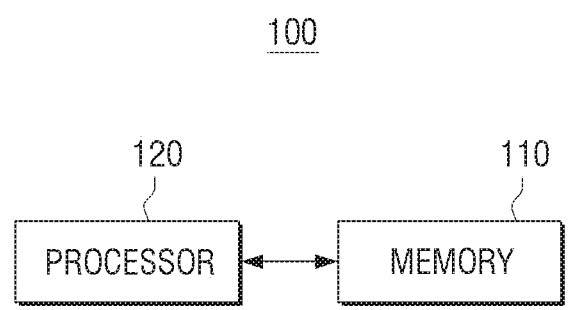
FIG. 1 is a block diagram schematically illustrating a configuration of an electronic apparatus according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In addition, expressions "first", "second", or the like, used in the disclosure may indicate various components regardless of a sequence and/or importance of the components, will be used only in order to distinguish one component from the other components, and do not limit the corresponding components. For example, a first user device and a second user device may indicate different user devices regardless of a sequence or importance thereof. For example, the first component may be named the second component and the second component may also be similarly named the first component, without departing from the scope of the disclosure.

When it is mentioned that any component (for example, a first component) is (operatively or communicatively) coupled with/to or is connected to another component (for example, a second component), it is to be understood that any component is directly coupled with/to another component or may be coupled with/to another component through the other component (for example, a third component). On the other hand, when it is mentioned that any component (for example, a first component) is "directly coupled with/to" or "directly connected to" to another component (for example, a second component), it is to be understood that the other component (for example, a third component) is not present between any component and another component.

Terms used in the disclosure may be used only to describe specific embodiments rather than restricting the scope of other embodiments. Singular forms are intended to include plural forms unless the context clearly indicates otherwise. Terms used in the specification including technical and scientific terms may have the same meanings as those that are generally understood by those skilled in the art to which the disclosure pertains. Terms defined in a general dictionary among terms used in the disclosure may be interpreted as meanings that are the same as or similar to meanings within a context of the related art, and are not interpreted as ideal or excessively formal meanings unless clearly defined in the disclosure. In some cases, terms may not be interpreted to exclude embodiments of the disclosure even though they are defined in the disclosure.

FIG. 1 is a block diagram schematically illustrating a configuration of an electronic apparatus according to an embodiment of the disclosure.

Referring to FIG. 1, the electronic apparatus illustrates an example of an apparatus that sparsifies and compresses a recurrent neural network artificial intelligence model. Before describing the electronic apparatus of FIG. 1 in detail, various terms related to the recurrent neural network artificial intelligence model will be described first.

Bayesian Neural Networks

Consider a neural network with weights w that model the dependency of target variables $y=\{y^1, \ldots, y^l\}$ on corresponding input objects $X=\{x^1, \ldots, x^l\}$. In a Bayesian neural network, the weights $\omega$ are treated as random variables. With a prior distribution $p(\omega)$, a posterior distribution $p(\omega|X, y)$ is searched for that will enable to find an expected target value during inference. In the case of neural networks, the true posterior is usually intractable, but it can be approximated by some parametric distribution $q_\lambda(\omega)$. The quality of this approximation is measured by the KL-divergence $KL(q_\lambda(\omega)\|p(\omega|X, y))$. The optimal parameter $\lambda$ can be found by maximization of the variational lower bound w.r.t. $\lambda$:

Equation 1 or (1)

$$\mathcal{L} = \sum_{i=1}^{l} \mathbb{E}_{q_\lambda(\omega)} \log p(y^i | x^i, \omega) - KL(q_\lambda(\omega)\|p(\omega))$$

The expected log-likelihood term in (1) is usually approximated by generating according to the Monte-Carlo method. To make the MC estimation unbiased, the weights are parametrized by a deterministic function: $\omega = g(\lambda, \xi)$, where $\xi$ is sampled from some non-parametric distribution (the reparameterization trick [12]). The KL-divergence term in (1) acts as a regularizer and is usually computed or approximated analytically.

It should be emphasized that the main advantage of the Bayesian sparsification techniques is that they have a small number of hyperparameters as compared to the pruning-based methods. Also, they provide a higher sparsity level ([18], [14], [4]).

Sparse Variational Dropout

Dropout ([24]) is a standard technique for regularization of neural networks. It implies that inputs of each layer are multiplied by a randomly generated noise vector. The elements of this vector are usually generated from the Bernoulli or normal distribution with parameters tuned using cross-validation. Kingma et al. ([13]) interpreted the Gaussian dropout from the Bayesian perspective that allowed to tune the dropout parameters automatically during model training. Later this model was extended to sparsify fully connected and convolutional neural networks resulting in the model called Sparse Variational Dropout (SparseVD) ([18]).

Consider one fully-connected layer of a feed-forward neural network with an input of size n, an output of size m, and a weight matrix W. Following Kingma et al. ([13]), in SparseVD the prior on the weights is a fully factorized log-uniform distribution $$p(|w_{ij}|) \propto \frac{1}{|w_{ij}|},$$

and the posterior is searched in the form of a fully factorized normal distribution:

$$q(w_{ij}|\theta_{ij}, \alpha_{ij}) = \mathcal{N}(\theta_{ij}, \alpha_{ij}\theta_{ij}^2). \qquad \text{Equation 2 or (2)}$$

Employment of such form of the posterior distribution is equivalent to applying multiplicative ([13]) or additive ([18]) normal noise to the weights in the following manner:

Equation 3 or (3)

$$w_{ij} = \theta_{ij}\xi_{ij}, \xi_{ij} \sim \mathcal{N}(1, \alpha_{ij}),$$

Equation 4 or (4)

$$w_{ij} = \theta_{ij} + \epsilon_{ij}, \epsilon_{ij} \sim \mathcal{N}(0, \sigma_{ij}^2), \alpha_{ij} = \frac{\sigma_{ij}^2}{\theta_{ij}^2}.$$

The representation (4) is called additive reparameterization ([18]). It reduces variance of gradients of $\mathcal{L}$ w.r.t. $\theta_{ij}$. Moreover, since a sum of normal distributions is a normal distribution with computable parameters, noise may be applied to a preactivation (an input vector times a weight matrix W) instead of W. This trick is called the local reparameterization trick ([26]; [13]), and it reduces variance of the gradients even further and makes training more efficient.

In SparseVD, optimization of the variational lower bound (1) is performed w.r.t. $\{\Theta, \log \sigma\}$. The KL-divergence factorizes over individual weights, and its terms depend only on $\alpha_{i,j}$ because of the specific choice of the prior ([13]):

$$KL(q(w_{ij}|\theta_{ij},\alpha_{ij})\|p(w_{ij}))=k(\alpha_{ij}).\qquad\text{Equation 5 or (5)}$$

Each term can be approximated as follows ([18]):

$$k(\alpha)\approx 0.64\sigma(1.87+1.49\log\alpha)-0.5\log(1+\alpha^{-1})+C.\qquad\text{Equation 6 or (6)}$$

The KL-divergence term encourages large values of $\alpha_{ij}$. If $\alpha_{ij}\to\infty$ for a weight $w_{ij}$, the posterior of this weight is a high-variance normal distribution, and it is beneficial for the model to put $\theta_{ij}=0$, as well as $\sigma_{ij}=\alpha_{ij}\theta^2=0$ to avoid inaccurate predictions. As a result, the posterior over $w_{ij}$ approaches a zero-centered $\delta$-function, the weight does not affect the output of the network and can be ignored.

Sparse Variational Dropout for Group Sparsity

In (4) SparseVD is extended to achieve group sparsity. Group sparsity implies that weights are divided into some groups, and the method prunes these groups instead of individual weights. As an example, let us consider groups of weights corresponding to one input neuron in a fully-connected layer and enumerate these groups by 1 ... n.

To achieve group sparsity, it is proposed to add extra multiplicative weights $z_i$ for each group and learn the weights in the following form:

$$w_{ij}=\hat{w}_{ij}z_i$$

In the fully-connected layer this is equivalent to putting multiplicative variables on input of the layer. Since the goal is to put $z_i=0$ and eliminate the neuron from the model, the prior-posterior pair for $z_i$ is the same as in SparseVD:

$$p(\hat{w}_{ij})=\mathcal{N}(\hat{w}_{ij}|0,1)$$

$$q(\hat{w}_{ij}|\theta_{ij},\sigma_{ij})=\mathcal{N}(\hat{w}_{ij}|\theta_{ij},\sigma_{ij}^2).$$

For individual weights $\hat{w}_{ij}$, it is proposed to use the standard normal prior and the normal approximate posterior with the learnable mean and variance $$p(\hat{w}_{ij})=\mathcal{N}(\hat{w}_{ij}|0,1)$$

$$q(\hat{w}_{ij}|\theta_{ij},\sigma_{ij})=\mathcal{N}(\hat{w}_{ij}|\theta_{ij},\sigma_{ij}^2).$$

In this model the prior on the individual weights encourages $\theta_{ij}\to 0$, and this helps the group means $\theta^z$ to approach 0.

Proposed Method

This section describes the basic approach for Bayesian sparsification of recurrent neural networks according to the disclosure, and then introduces a method for group Bayesian sparsification of recurrent networks with long short-term memory (LSTM). LSTM is considered herein, because it is one of the most popular recurrent architectures nowadays.

Bayesian Sparsification of Recurrent Neural Networks

The recurrent neural network takes a sequence $x=[x_0, \ldots, x_T]$, $x_t\in\mathbb{R}^n$ as an input and maps it onto a sequence of hidden states:

$$h_t=f_h(x_t,h_{t-1})=g_h(W^xx_t+W^hh_{t-1}+b_1), h_t\in\mathbb{R}^m, h_0=\overline{0}.\qquad\text{Equation 7 or (7)}$$

Throughout this specification, it is assumed that the output of the RNN depends only on the last hidden state:

$$y=f_y(h_T)=g_y(W^yh_T+b_2).\qquad\text{Equation 8 or (8)}$$

Here $g_h$ and $g_y$ are some nonlinear functions. However, all the techniques discussed hereinbelow can be further readily applied to more complex cases, e.g. a language model with several outputs for one input sequence (one output for each time step).

We apply SparseVD to RNNs to achieve sparsification of weights. However, recurrent neural networks have a certain specificity, and it should be taken into account when constructing the probabilistic model according to the disclosure.

Following Molchanov et al. ([18]), the fully factorized log-uniform prior is used, and the posterior is approximated with the fully factorized normal distribution over weights $\omega=\{W^x, W^h\}$:

$$q(w_{ki}^x|\theta_{ki}^x,\sigma_{ki}^x)=\mathcal{N}(w_{ki}^x|\theta_{ki}^x,\sigma_{ki}^{x\,2},$$

$$q(w_{ii}^h|\theta_{ii}^h,\sigma_{ii}^h)=\mathcal{N}(w_{ii}^h|\theta_{ii}^h,\sigma_{ii}^{h\,2},\qquad\text{Equation 9 or (9)}$$

where $\sigma_{ki}^x$ and $\sigma_{ii}^h$ have the same meaning as in the additive reparameterization (4).

To train the model, the variational lower bound approximation is maximized

Equation 10 or (10)

$$\sum_{i=1}^{\ell}\int q(\omega\mid\Theta,\sigma)\log$$

$$(y^i\mid f_y(f_h(x_T^i, f_h(\ldots f_h(x_1^i, h_0^i)))))d\omega - \sum_{k,i=1}^{n,m}k\!\left(\frac{\sigma_{ki}^{x\,2}}{\theta_{ki}^{x\,2}}\right) - \sum_{j,i=1}^{m,m}k\!\left(\frac{\sigma_{ji}^{h\,2}}{\theta_{ji}^{h\,2}}\right)$$

w.r.t. $\{\Theta, \log \sigma\}$ using stochastic methods of optimization over mini-batches. Here the recurrence in the expected log-likelihood term is unfolded as in (7), and the KL is approximated using (6). The integral in (10) is estimated with a single sample $\tilde{\omega}_i\sim q(\omega|\Theta,\alpha)$ per mini-batch. The reparameterization trick (for unbiased integral estimation) and the additive reparameterization (for gradients variance reduction) are used to sample both the input-to-hidden and hidden-to-hidden weight matrices $W^x$, $W^h$.

The local reparameterization trick cannot be applied to either the hidden-to-hidden matrix $W^h$ or the input-to-hidden matrix $W^x$. Since the usage of 3-dimensional noise (2 dimensions of $W^h$ and the mini-batch size) is too resource-consuming, one noise matrix is generated for all objects in a mini-batch for efficiency:

$$w_{ik}^x=\theta_{ik}^x+\epsilon_{ik}^x\sigma_{ik}^x, \epsilon_{ik}^x\sim\mathcal{N}(\epsilon_{ik}^x|0,1)\qquad\text{Equation 11 or (11)}$$

$$w_{ij}^h=\theta_{ij}^h+\epsilon_{ij}^h\sigma_{ij}^h, \epsilon_{ij}^h\sim\mathcal{N}(\epsilon_{ij}^h|0,1)\qquad\text{Equation 12 or (12)}$$

The technique provided herein works as follows: the input-to-hidden and hidden-to-hidden weight matrices are sampled (one per mini-batch), the variational lower bound (10) is optimized w.r.t. $\{\Theta, \log \sigma\}$, and the posterior is obtained for many weights in the form of the zero-centered $\delta$-function, because the KL-divergence encourages sparsity. These weights can then be safely removed from the model.

In LSTM the same prior-posterior pair is considered for all input-to-hidden and hidden-to-hidden matrices, and all computations stay the same. The noise matrices for input-to-hidden and hidden-to-hidden connections are generated individually for each of the gates i, o, f and input modulation g.

Group Bayesian Sparsification of LSTMs

In (4) there are two levels of noise: the noise on groups of weights and the noise on individual weights. However, popular recurrent neural networks usually have more complex gated structure that may be utilized to achieve better compression and acceleration level. In LSTM, there is an internal memory $c_t$, and the three gates control updates, erasing, and releasing information from this memory:

$$i=\sigma(W_i^h h_{t-1}+W_i^x x_t+b_i) \quad f=\sigma(W_f^h h_{t-1}+W_f^x x_t+b_f) \quad \text{Equation 13 or (13)}$$

$$g=\tanh(W_g^h h_{t-1}+W_g^x x_t+b_g) \quad o=\sigma(W_o^h h_{t-1}+W_o^x x_t+b_o) \quad \text{Equation 14 or (14)}$$

$$c_t=f\odot c_{t-1}+i\odot g \quad h_t=o\odot \tanh(c_t) \quad \text{Equation 15 or (15)}$$

To encounter for this gated structure, it is proposed to add an intermediate level of noise into the LSTM layer along with the noise on the weights and on the input ($z^x$) and hidden neurons ($z^h$). Specifically, the multiplicative noise $z^i$, $z^f$, $z^o$, $z^g$ is imposed on the preactivations of each gate and of the information flow g. The resulting LSTM layer looks as follows:

$$i=\sigma((W_i^h(h_{t-1}\odot z^h)+W_i^x(x_t\odot z^x))\odot z^i+b_i) \quad \text{Equation 16 or (16)}$$

$$f=\sigma((W_f^h(h_{t-1}\odot z^h)+W_f^x(x_t\odot z^x))\odot z^f+b_f) \quad \text{Equation 17 or (17)}$$

$$g=\tanh((W_g^h(h_{t-1}\odot z^h)+W_g^x(x_t\odot z^x))\odot z^g+b_g) \quad \text{Equation 18 or (18)}$$

$$o=\sigma((W_o^h(h_{t-1}\odot z^h)+W_o^x(x_t\odot z^x))\odot z^o+b_o) \quad \text{Equation 19 or (19)}$$

$$c_t=f\odot c_{t-1}+i\odot g \quad h_t=o\odot \tanh(c_t) \quad \text{Equation 20 or (20)}$$

This model is equivalent to putting the group multiplicative variables not only on the columns of the weight matrices (as in (4)), but also on their rows. For example, for the matrix $W_f^h$ this parametrization looks like:

$$w_{f,ij}^h=\hat{w}_{f,ij}^h \cdot z_i^h \cdot z_j^f.$$

For the other 7 weights matrices of LSTM the formulas are obtained in the same way.

As in (4), if some component of $z^x$ or $z^h$ approaches 0, the corresponding neuron may be removed from the model. But a similar property also exists for the gates: if some component of $z^i$, $z^f$, $z^o$, $z^g$ approaches 0, the corresponding gate or information flow component becomes constant. This means that it is not needed to compute this gate, and the forward pass through the LSTM is accelerated.

Also, the new intermediate level of noise enables to sparsify input and hidden neurons. The three-level hierarchy works as follows: the noise on individual weights enables to zero values of individual weights, the intermediate noise level on the gates and information flow improves sparsification of intermediate variables (the gates and information flow), and the last noise level, in turn, enables to entirely sparsify neurons.

In (4), it is proposed to put the standard normal prior on individual weights. For example, the model for $W_f^h$ components is as follows:

$$p(\hat{w}_{f,ij}^h) = \mathcal{N}(\hat{w}_{f,ij}^h \mid 0, 1); q(\hat{w}_{f,ij}^h) = \mathcal{N}(\hat{w}_{f,ij}^h \mid \theta_{f,ij}^h, (\sigma_{f,ij}^h)^2); \quad \text{Equation 21 or (21)}$$

$$p(z_i^h) = \frac{1}{|z_i^h|}; q(z_i^h) = \mathcal{N}(z_i^h \mid \theta_i^h, (\sigma_i^h)^2) \quad \text{Equation 22 or (22)}$$

$$p(z_j^f) = \frac{1}{|z_j^f|}; q(z_j^f) = \mathcal{N}(z_j^f \mid \theta_j^f, (\sigma_j^f)^2). \quad \text{Equation 23 or (23)}$$

It has been confirmed experimentally that the usage of the log-uniform prior instead of the standard normal one for individual weights boosts sparsification of the group variables. So, the same prior-posterior pair as in SparseVD is used for all variables.

To train the model, the same workflow as in SparseVD for RNNs is used, but, in addition to generating W, the multiplicative group variables are also generated.

Bayesian Compression for Natural Language Processing

In natural language processing tasks, the majority of weights in RNNs are often concentrated in the first layer that is connected to a vocabulary, for example, in the embedding layer. However, for some tasks, most of words are unnecessary for accurate predictions. In the model proposed herein, it is proposed to introduce multiplicative weights for words to perform vocabulary sparsification (see subsection 4.3). These multiplicative weights are zeroing out during training, thereby causing filtering respective unnecessary words out of the model. It enables to boost the RNN sparsification level even further.

Notations

In the rest of the specification x=[x0, . . . , xT] is an input sequence, y is a true output and is an output predicted by an RNN (y and may be vectors, sequences of vectors, etc.). X, Y denote a training set {(x1, y1), . . . , (xN, yN)}. All weights of the RNN except biases are denoted by ω, while a single weight (an element of any weight matrix) is denoted by wij. Note that the biases are detached herein and denoted by B because they are not sparsified.

For definiteness, the model on an exemplary architecture for a language modeling task, where y=[$x_1$, . . . , $x_T$], will be illustrated as follows:

embedding: $\tilde{x}_t = w_{x_t}^e$;
recurrent: $h_{t+1} = \sigma(W^h h_t + W^x \tilde{x}_{t+1} + b^r)$;
fully-connected: $\hat{y}_t = \text{softmax}(W^d h_t + b^d)$.

In this example, ω={$W^e$, $W^x$, $W^h$, $W^d$}, B={$b^r$, $b^d$}. However, the model may be directly applied to any recurrent architecture.

Sparse variational dropout for RNNs

As previously outlined, (following [4], [18]), it is proposed to put the fully-factorized log-uniform prior over the weights:

$$p(\omega) = \prod_{w_{ij}\in\omega} p(w_{ij}), \; p(w_{ij}) \propto \frac{1}{|w_{ij}|},$$

and approximate the posterior with the fully factorized normal distribution:

$$q(w \mid \theta, \sigma) = \prod_{w_{ij} \in \omega} \mathcal{N}(w_{ij} \mid \theta_{ij}, \sigma_{ij}^2).$$

The task of the posterior approximation $\min_{\theta,\sigma,B}$ KL(q($\omega|\theta, \sigma$)||p($\omega$|X, Y, i)) is equivalent to the variational lower bound optimization ([18]):

Equation 24 or (24)

$$-\sum_{i=1}^{N} \int q(\omega \mid \theta, \sigma) \log p(y^i \mid x_0^i, \ldots, x_T^i, \omega, B) d\omega ++ \sum_{w_{ij} \in \omega} KL(q(w_{ij} \mid \theta_{ij}, \sigma_{ij}) \| p(w_{ij})) \to \min_{\theta,\sigma,B}.$$

Here, the first term, a task-specific loss function, is approximated using one sample from q($\omega|\theta, \sigma$). The second term is a regularizer that makes the posterior more similar to the prior and induces sparsity. Said regularizer can be very approximated with high accuracy analytically Equation 25 or (25)

$$KL\left(q(w_{ij} \mid \theta_{ij}, \sigma_{ij}) \| p(w_{ij})\right) \approx k\left(\frac{\sigma_{ij}^2}{\theta_{ij}^2}\right),$$

$$k(\alpha) \approx 0.64\sigma(1.87 + 1.49\log\alpha) - \frac{1}{2}\log\left(1 + \frac{1}{\alpha}\right).$$

To make estimation of the integral unbiased, the generating from the posterior is performed using the reparametrization trick [12]:

$$w_{ij} = \theta_{ij} + \sigma_{ij}\epsilon_{ij}, \epsilon_{ij} \sim \mathcal{N}(\epsilon_{ij}|0,1).$$ Equation 26 or (26)

The important difference of RNNs from feed-forward networks is in sharing the same weights in different timesteps. Thus, the same sample of weights should be used for each timestep t when computing the likelihood $p(y^i|x_0^i, \ldots, x_T^i, \omega, B)$ ([6], [7], [5]).

Kingma et al. [13], Molchanov et al. [18] also use the local reparametrization trick (LRT) that samples preactivations instead of individual weights. For example, $$(W^x x_t)_i = \sum_j \theta_{ij}^x x_{tj} + \epsilon_i \sqrt{\sum_j (\sigma_{ij}^x)^2 x_{tj}^2}..$$

Tied weight sampling makes LRT not applicable to weight matrices that are used in more than one timestep in the RNN.

For the hidden-to-hidden matrix $W^h$ the linear combination $(W^h h_t)$ is not normally distributed, because $h_t$ depends on $W^h$ from the previous timestep. As a result, the rule about a sum of independent normal distributions with constant coefficients is not applicable. In practice, a network with LRT on hidden-to-hidden weights cannot be trained properly.

For the input-to-hidden matrix $W^x$ the linear combination $(W^x x_t)$ is normally distributed. However, sampling the same $W^x$ for all timesteps is not equivalent to sampling the same noise $\epsilon_i$ for preactivations for all timesteps. The same sample of $W^x$ corresponds to different samples of noise $\epsilon_i$ at different timesteps because of the different $x_t$. Hence, theoretically LRT is not applicable here. In practice, networks with LRT on input-to-hidden weights may give similar results and, in some experiments, they even converge a bit faster.

Since the training procedure is effective only with 2D noise tensor, it is proposed to sample the noise on the weights per mini-batch, not per individual object.

To sum up, the training procedure is as follows. To perform the forward pass for a mini-batch, it is proposed to first generate all weights $\omega$ following (26), and then apply RNN as usual. Then, the gradients of (24) are computed w.r.t. $\theta$, log $\sigma$, B.

During the testing stage, the mean weights $\theta$ [18] are used. The regularizer (25) causes the majority of $\theta$ components approach 0, and the weights are sparsified. More precisely, weights with low signal-to noise ratio $$\frac{\theta_{ij}^2}{\sigma_{ij}^2} < \tau,$$

are eliminated [18].

Multiplicative Weights for Vocabulary Sparsification

One of the advantages of the Bayesian sparsification is easy generalization for sparsification of any group of weights that does not complicate the training procedure ([4]). To this end, one should introduce a shared multiplicative weight per each group, and elimination of this multiplicative weight will mean elimination of the respective group. It is proposed to utilize this approach herein to achieve vocabulary sparsification.

Specifically, it is proposed to introduce multiplicative probabilistic weights $z \in \mathbb{R}^V$ for words in the vocabulary (here V is the size of the vocabulary). The forward pass with z looks as follows:

sample a vector $z^i$ from the current approximation of the posterior for each input sequence $x^i$ from the mini-batch;

multiply each token $x_t^i$ (encoded with a vector of 0s and 1s, with one 1, i.e. one-hot encoded token) from the sequence $x^i$ by $z^i$ (here both $x^i$ and $z^i$ are V-dimensional);

continue the forward pass as usual.

It is proposed to work with z in the same way as with other weights W: the log-uniform prior is used, and the posterior is approximated with the fully-factorized normal distribution having trainable mean and variance. However, since z is a one-dimensional vector, it can be generated individually for each object in a mini-batch to reduce variance of the gradients. After training, elements of z with a low signal-to-noise ratio are pruned, and subsequently the corresponding words from the vocabulary are not used and columns of weights are dropped from the embedding or input-to-hidden weight matrices.

Experiments

It is proposed to perform experiments with the LSTM architecture on two types of problems: text classification and language modeling. Three models are compared here: the baseline model without any regularization, the SparseVD model, and the SparseVD model with multiplicative weights for vocabulary sparsification (SparseVD-Voc) according to the present disclosure.

To measure the sparsity level of the models, compression rate of individual weights is calculated as follows: $|w|/|w\neq 0|$. The sparsification of weights may lead not only to the compression, but also to acceleration of RNNs through group sparsity. Hence, it is proposed to report the number of remaining neurons in all layers: input (vocabulary), embedding, and recurrent. To compute this number for the vocabulary layer in SparseVD-Voc, introduced variables zv are used. For all other layers in SparseVD and SparseVD-Voc, a neuron is dropped if all weights connected to this neuron are eliminated.

Networks are optimized herein using [11]. Baseline networks overfit for all the tasks under analysis, therefore, it is proposed to present results for them with early stopping. For all weights being sparsified, $\log \sigma$ has been initialized with −3. Weights with signal-to-noise ratio less then $\tau = 0.05$ have been eliminated. More details about the experiment setup are presented in Appendix A.

Text Classification

The inventive approach has been evaluated on two standard datasets for text classification: IMDb dataset ([9]) for binary classification and AGNews dataset ([10]) for four-class classification. It is proposed to have set aside 15% and 5% of training data for validation purposes, respectively. For both datasets, the vocabulary of 20,000 most frequent words has been used.

It is proposed to use networks with one embedding layer of 300 units, one LSTM layer of 128/512 hidden units for IMDb/AGNews, and, finally, the fully connected layer applied to the last out-put of the LSTM. The embedding layer has been initialized with word2vec ([15])/GloVe ([17]), and SparseVD and SparseVD-Voc models have been trained for 800/150 epochs on IMDb/AGNews.

The results are shown in Table 1. SparseVD leads to a very high compression rate without a significant quality drop. SparseVD-Voc boosts compression rate, still without a significant decrease in accuracy. Such high compression rates are achieved mostly because of the sparsification of the vocabulary: to classify texts, it is required to read only some important words therefrom. The words remaining after the sparsification in the proposed models are mostly interpretable for the task (see Appendix B for the list of remaining words for IMBb).

TABLE 1

Table 1: Results on text classification tasks. Compression is equal to $|w|/|w \neq 0|$. In last two columns number of remaining neurons in the input, embedding and recurrent layers are reported.

| Task | Method | Accuracy % | Compression | Vocabulary | Neurons x̃-h |
|---|---|---|---|---|---|
| IMDb | Original | 84.1 | 1x | 20000 | 300-128 |
|  | SparseVD | 85.1 | 1135x | 4611 | 16-17 |
|  | SparseVD-Voc | 83.6 | 12985x | 292 | 1-8 |
| AGNews | Original | 90.6 | 1x | 20000 | 300-512 |
|  | SparseVD | 88.8 | 322x | 5727 | 179-56 |
|  | SparseVD-Voc | 89.2 | 469x | 2444 | 127-32 |

Language Modeling

It is proposed to evaluate the inventive models on the task of character-level and word-level language modeling on the Penn Treebank corpus ([19]) according to the train/validation/test partition of [21]. The dataset has a vocabulary of 50 characters or 10,000 words.

To solve character/word-level tasks, it is proposed to use networks with one LSTM layer of 1000/256 hidden units and fully-connected layer with softmax activation to predict next character or word. The SparseVD and SparseVD-Voc models have been trained for 250/150 epochs on character-level/word-level tasks.

The results are shown in Table 2. To obtain these results, LRT on the last fully-connected layer has been employed. In the experiments with language modeling, LRT on the last layer has accelerated the training without adversely affecting the final result. Here, such extreme compression rates as in the previous experiment have not been achieved, but the capability to compress the models several times while achieving better quality w.r.t. the baseline is still preserved because of the regularization effect of SparseVD. The input vocabulary has not been sparsified in the character-level task, because there are only 50 characters and all of them are of matter. In the word-level task more than half of the words have been dropped. However, since in language modeling almost all words are important, the sparsification of the vocabulary makes the task more difficult to the network and leads to the drop in quality and the overall compression (network needs more difficult dynamic in the recurrent layer).

TABLE 2

Table 2: Results on language modeling tasks. Compression is equal to |w|/|w ≠ 0|. In last two columns number of remaining neurons in input and recurrent layers are reported.

| Task | Method | Valid | Test | Compression | Vocabulary | Neurons h |
|---|---|---|---|---|---|---|
| Char PTB | Original | 1.498 | 1.454 | 1x | 50 | 1000 |
| Bits-per-char | SparseVD | 1.472 | 1.429 | 4.2x | 50 | 431 |
| | SparseVD-Voc | 1.4584 | 1.4165 | 3.53x | 48 | 510 |
| Word PTB | Original | 135.6 | 129.5 | 1x | 10000 | 256 |
| Perplexity | SparseVD | 115.0 | 109.0 | 14.0x | 9985 | 153 |
| | SparseVD-Voc | 126.3 | 120.6 | 11.1x | 4353 | 207 |

Experimental Setup

Initialization for text classification. The hidden-to-hidden weight matrices $W^h$ are initialized orthogonally and all other matrices are initialized uniformly using the method by [22].

The networks have been trained using mini-batches of size 128 and learning rate of 0.0005.

Initialization for language modeling. All weight matrices of the networks have been initialized orthogonally, and all biases have been initialized with zeros. Initial values of hidden and LSTM elements are not trainable and equal to zero.

For the character-level task, the networks have been trained on non-overlapping sequences of 100 characters in mini-batches of 64 using learning rate of 0.002 and clip gradients with threshold 1.

For the word-level task, the networks have been unrolled for 35 steps. The final hidden states of the current mini-batch have been used as the initial hidden state of the subsequent mini-batch (successive mini batches sequentially traverse the training set). The size of each mini-batch is 32. The models have been trained using learning rate of 0.002 and clip gradients with threshold 10.

List of Remained Words on IMDB

SparseVD with multiplicative weights retained the following words on the IMDB task (sorted by descending frequency in the whole corpus):

start, oov, and, to, is, br, in, it, this, was, film, t, you, not, have, It, just, good, very, would, story, if, only, see, even, no, were, my, much, well, bad, will, great, first, most, make, also, could, too, any, then, seen, plot, acting, life, over, off, did, love, best, better, i, If, still, man, some-thing, m, re, thing, years, old, makes, director, nothing, seems, pretty, enough, own, original, world, series, young, us, right, always, isn, least, interesting, bit, both, script, minutes, making, 2, performance, might, far, anything, guy, She, am, away, woman, fun, played, worst, trying, looks, especially, book, digital versatile disc (DVD), reason, money, actor, shows, job, 1, someone, true, wife, beautiful, left, idea, half, excellent, 3, nice, fan, let, rest, poor, low, try, classic, production, boring, wrong, enjoy, mean, No, instead, awful, stupid, remember, wonderful, often, become, terrible, others, dialogue, perfect, liked, supposed, entertaining, waste, His, problem, Then, worse, definitely, 4, seemed, lives, example, care, loved, Why, tries, guess, genre, history, enjoyed, heart, amazing, starts, town, favorite, car, today, decent, brilliant, horrible, slow, kill, attempt, lack, interest, strong, chance, wouldn't, sometimes, except, looked, crap, highly, wonder, annoying, Oh, simple, reality, gore, ridiculous, hilarious, talking, female, episodes, body, saying, running, save, disappointed, 7, 8, OK, word, thriller, Jack, silly, cheap, Oscar, predictable, enjoyable, moving, Un-fortunately, surprised, release, effort, 9, none, dull, bunch, comments, realistic, fantastic, weak, atmosphere, apparently, premise, greatest, believable, lame, poorly, NOT, superb, badly, mess, perfectly, unique, joke, fails, masterpiece, sorry, nudity, flat, Good, dumb, Great, D, wasted, unless, bored, Tony, language, incredible, pointless, avoid, trash, failed, fake, Very, Stewart, awesome, garbage, pathetic, genius, glad, neither, laughable, beautifully, excuse, disappointing, disappointment, outstanding, stunning, noir, lacks, gem, F, redeeming, thin, absurd, Jesus, blame, rubbish, unfunny, Avoid, irritating, dreadful, skip, racist, Highly, MST3K.

FIG. 1 is a block diagram schematically illustrating a configuration of an electronic apparatus according to an embodiment of the disclosure.

Referring to FIG. 1, an electronic apparatus 100 may include a memory 110 and a processor 120. The electronic apparatus 100 according to diverse embodiments of the disclosure may include at least one of, for example, a smartphone, a tablet personal computer (PC), a mobile phone, an image phone, an e-book reader, a desktop PC, a laptop PC, a netbook computer, a medical device, a camera, or a wearable device. The wearable device may include at least one of an accessory type wearable device (for example, a watch, a ring, a bracelet, a necklace, a glasses, a contact lens, or a head-mounted-device (HMD)), a textile or clothing integral type wearable device (for example, an electronic clothing), a body attachment type wearable device (for example, a skin pad or a tattoo), or a bio-implantable circuit.

The memory 110 may store instructions or data related to one or more other components of the electronic apparatus 100, for example. In particular, the memory 110 may be implemented by a non-volatile memory, a volatile memory, a flash-memory, a hard disk drive (HDD), a solid state drive (SDD), or the like. The memory 110 is accessed by the processor 120, and readout, writing, correction, deletion, update, and the like, of data in the memory 110 may be performed by the processor 120. In the disclosure, a term 'memory' includes the memory 110, a read only memory (ROM) (not illustrated) in the processor 120, a random access memory (RAM) (not illustrated), or a memory card (not illustrated) (for example, a micro secure digital (SD) card or a memory stick) mounted in the electronic apparatus 100. In addition, the memory 110 may store programs and data for configuring a variety of screens to be displayed on a display region of a display.

In particular, the memory 110 may store a program for performing an artificial intelligence agent. Here, the artificial intelligence agent is a personalized program for providing various services for the electronic apparatus 100.

Here, the processor 120 may include one or more of a central processing unit, an application processor, or a communication processor (CP).

In addition, the processor 120 may be implemented as at least one of an application specific integrated circuit (ASIC), an embedded processor, a microprocessor, a hardware control logic, a hardware finite state machine (FSM), or a digital signal processor (DSP). Although not illustrated, the processor 120 may further include an interface such as a bus for communicating with the respective components.

The processor 120 may drive, for example, an operating system or an application program to control a plurality of hardware or software components connected to the processor 120, and perform various kinds of data processing and calculation. The processor 120 may be implemented by, for example, a system on chip (SoC). According to an embodiment, the processor 120 may further include a graphic processing unit (GPU) and/or an image signal processor. The processor 120 may load and process instructions or data received from at least one of other components (e.g., a non-volatile memory) in a volatile memory, and store result data in the non-volatile memory.

Meanwhile, the processor 120 may include a dedicated processor for artificial intelligence (AI), or may be fabricated as a part of an existing general-purpose processor (e.g., central processing unit (CPU) or application processor) or a graphic dedicated processor (e.g., graphic processing unit (GPU)). In this case, the dedicated processor for artificial intelligence is a dedicated processor specialized for probability calculation, and has higher parallel processing performance than the conventional general-purpose processor, so it may quickly process calculation operations in an artificial intelligence field such as machine learning.

In particular, the processor 120 according to an embodiment of the disclosure may obtain first multiplicative variables for input elements of the recurrent neural network. The input elements may be vocabularies or words, as described above. In addition, the processor 120 may obtain second multiplicative variables for an input neuron and a hidden neuron of the recurrent neural network. The second multiplicative variable for the input neuron may be expressed as $z^x$ as described above, the second multiplicative variable for the hidden neuron may be expressed as $z^h$.

After obtaining the first multiplicative variables and the second multiplicative variables, the processor 120 may learn the recurrent neural network by using weights of the recurrent neural network and the obtained first and second multiplicative variables.

The processor 120 may learn the recurrent neural network by initializing a mean and a variance for the weights of the recurrent neural network and the obtained first and second multiplicative variables, and optimizing objectives related to the mean and the variance of the weights and the obtained first and second multiplicative variables.

The objective corresponds to $$\mathcal{L} = \sum_{i=1}^{\ell} \mathbb{E}_{q_\lambda(\omega)} \log p(y^i \mid x^i, \omega) - KL(q_\lambda(\omega) \| p(\omega))$$

in [Mathematical Expression 1]. The optimization for the objective may be performed by using stochastic optimization.

The processor 120 selects a mini batch of the objectives, and generates the weights and the first and second multiplicative variables from approximated posterior distribution to forward pass the recurrent neural network. Here, the weights may be generated by the mini batch, and a first group variable and a second group variable may be generated separately from the objectives. Thereafter, the processor 120 calculates the objective, and calculates a gradient for the objective. In addition, the processor 120 may obtain (update) the mean and the variance for the weights and the first and second multiplicative variables based on the calculated gradient to perform the optimization for the objective.

If the learning of the recurrent neural network is completed, the processor 120 may perform sparsification for the weights, the first multiplicative variable, and the second multiplicative variable based on the obtained mean and variance.

The sparsification is a method of compressing the recurrent neural network by making a predetermined weight, first multiplicative variable, or second multiplicative variable zero, and the processor 120 may calculate an associated value for performing the sparsification based on the obtained mean and variance. The associated value is a ratio of square of mean to variance, and is expressed as $$\frac{\theta_{ij}^2}{\sigma_{ij}^2}$$

as described above.

The processor 120 may perform the sparsification for the recurrent neural network artificial intelligence model by setting a weight, a first multiplicative variable, or a second multiplicative variable in which an associated value is smaller than a predetermined value to zero.

The predetermined value may be 0.05, but is not limited thereto.

According to an embodiment of the disclosure, if the recurrent neural network includes a gated structure, the processor 120 obtains (introduces) third multiplication variables relating to preactivation of gates to make the gates of a recurrent layer of the recurrent neural network constant. The third multiplicative variables may be expressed as $z^i$, $z^f$, $z^o$, $z^g$ as described above.

If the recurrent neural network includes the gated structure, the processor 120 may further include the third multiplicative variables to learn the recurrent neural network and perform the sparsification for the recurrent neural network artificial intelligence model, in a case in which the processor 120 performs the optimization and the sparsification. That is, the processor 120 obtains the first multiplicative variables to the third multiplicative variables, and may then learn the recurrent neural network by using the weights of the recurrent neural network, the first multiplicative variables, the second multiplicative variables, and the third multiplicative variables.

The processor 120 may learn the recurrent neural network by initializing a mean and a variance for the weights and the first to third multiplicative variables, and optimizing objectives related to the mean and the variance of the weights and the first to third multiplicative variables.

The processor 120 may select a mini batch of the objectives, sample (generate) the weights and the first to third multiplicative variables from approximated posterior distribution, and forward pass the recurrent neural network based on the weights and first to third group variables to calculate the objectives. Thereafter, the processor 120 calculate a gradient of the objective, and perform an optimization for the objectives through a process of obtaining the mean and the variance for the weights and the first to third multiplicative variables based on the gradient.

If the learning of the recurrent neural network is completed, the processor 120 may perform sparsification for the weights and the first to third multiplicative variables based on the obtained mean and variance.

The sparsification is a method of compressing the recurrent neural network by making a predetermined weight, first multiplicative variable, second multiplicative variable, or third multiplicative variable zero, and the processor 120 may calculate an associated value for performing the sparsification based on the obtained mean and variance. The associated value is a ratio of square of mean to variance for the weights and the first to third multiplicative variables, and is expressed as $$\frac{\theta_{ij}^2}{\sigma_{ij}^2}$$

as described above.

The processor 120 may perform the sparsification for the recurrent neural network artificial intelligence model by setting a weight, a first multiplicative variable, a second multiplicative variable, or a third multiplicative variable in which an associated value is smaller than a predetermined value to zero.

The gated structure of the recurrent neural network may be implemented as a long-short term memory (LSTM) layer, and a detailed description thereof has been described above and is thus omitted.

Figure 2:
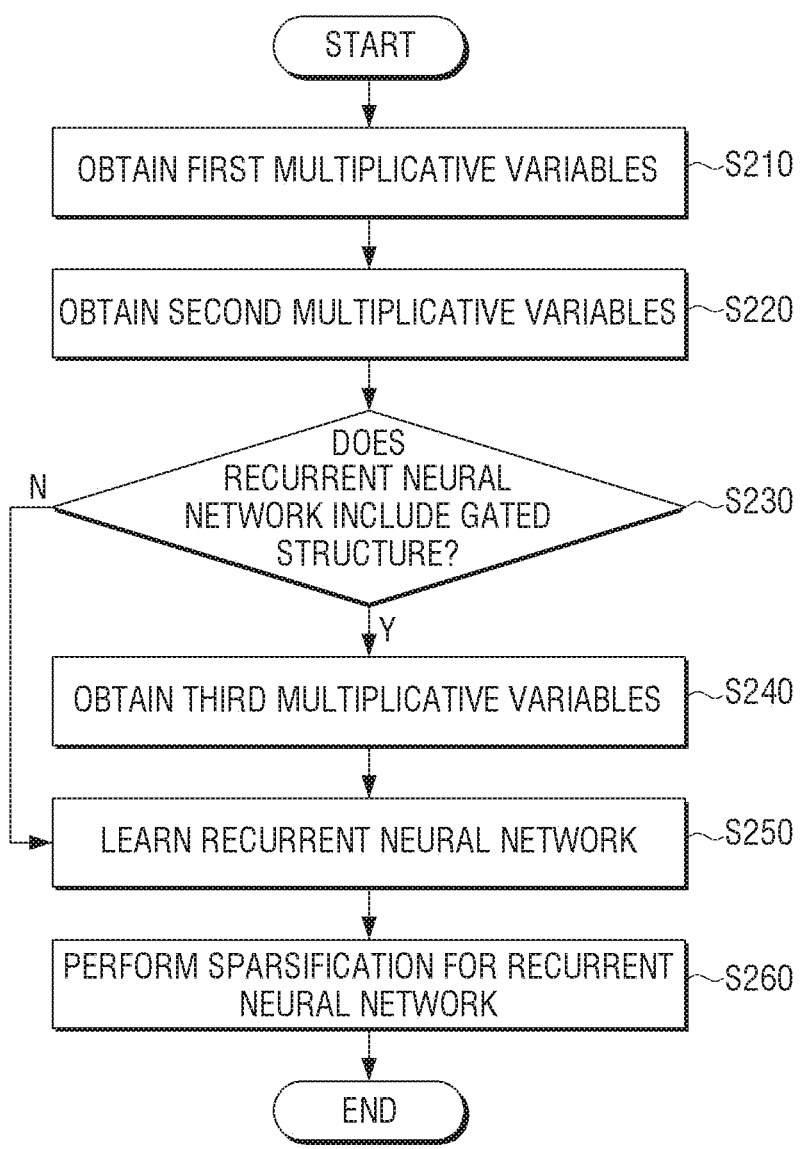
FIG. 2 is a flowchart illustrating a method for compressing a recurrent neural network artificial intelligence model according to an embodiment of the disclosure.

FIG. 2 is a flowchart illustrating a method for compressing a recurrent neural network artificial intelligence model according to an embodiment of the disclosure.

First, the electronic apparatus 100 obtains first multiplicative variables for input elements of a recurrent neural network at operation S210. The input elements may be vocabularies or words, as described above. In addition, the electronic apparatus 100 obtains second multiplicative variables for an input neuron and a hidden neuron of the recurrent neural network at operation S220. The second multiplicative variable for the input neuron may be expressed as $z^x$ as described above, the second multiplicative variable for the hidden neuron may be expressed as $z^h$.

If the recurrent neural network includes a gated structure (Yes in operation S230), the electronic apparatus 100 obtains third multiplicative variables for preactivation of gates at operation S240. The third multiplicative variables may be expressed as $z^i$, $z^f$, $z^o$, $z^g$ as described above.

The electronic apparatus 100 learns the recurrent neural network based on the obtained multiplicative variables and the weights of the recurrent neural network at operation S250. In addition, the electronic apparatus 100 performs sparsification for the recurrent neural network based on the learned weights and the multiplicative variables at operation S260 and ends the processing.

If the recurrent neural network does not include the gated structure (No in operation S230), the electronic apparatus 100 learns the recurrent neural network based on the weights of the recurrent neural network, the first multiplicative variables, and the second multiplicative variables at operation S250, performs the sparsification for the recurrent neural network at operation S260, and ends the processing.

Figure 3:
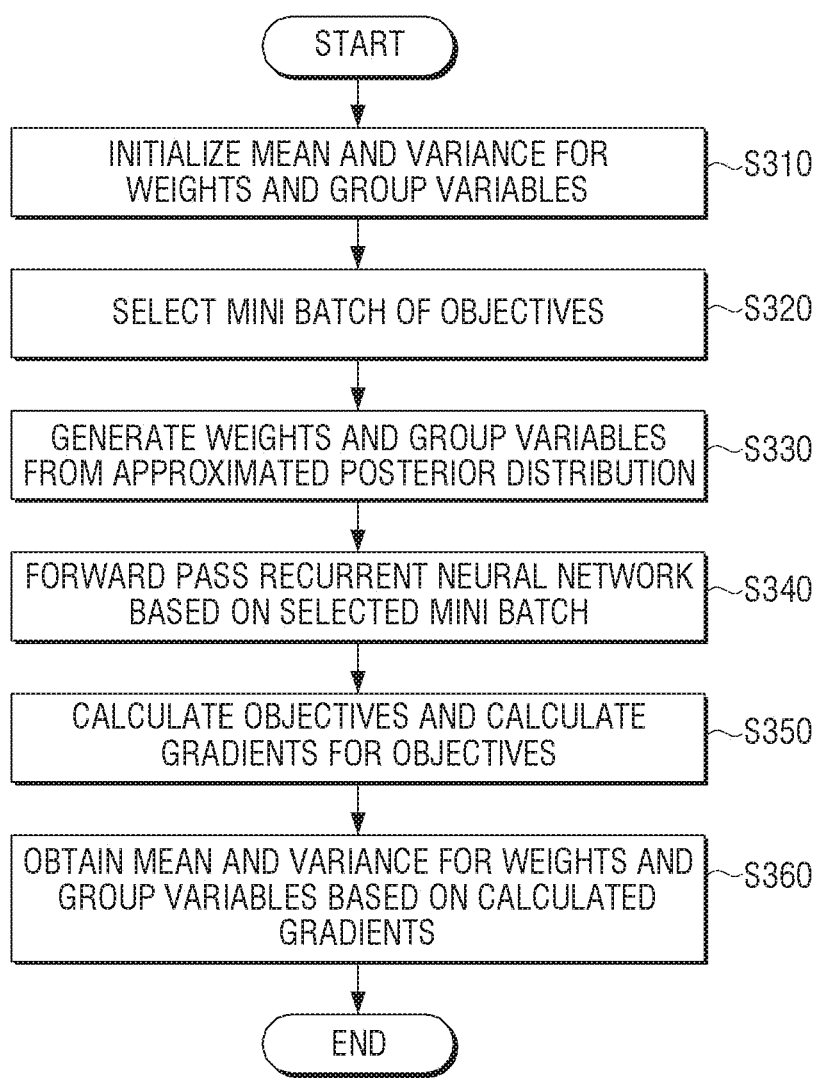
FIG. 3 is a flowchart illustrating a learning method of a recurrent neural network artificial intelligence model according to an embodiment of the disclosure.

FIG. 3 is a flowchart illustrating a learning method of a recurrent neural network artificial intelligence model according to an embodiment of the disclosure.

First, the electronic apparatus 100 initialize a mean and a variance for the weights and the group variables at operation S310. The group variables include first and second group variables, and may further include a third group variables in case that the recurrent neural network includes the gated structure.

In addition, the electronic apparatus 100 selects a mini batch of objectives at operation S320, and generates (samples) the weights and the group variables from approximated posterior distribution at operation S330.

The electronic apparatus 100 forward passes the recurrent neural network by using the mini batch based on the generated weights and group variables at operation S340.

In addition, the electronic apparatus 100 calculates the objective and calculates a gradient for the objective at operation S350.

In addition, the electronic apparatus 100 obtains a mean and a variance for the weights and the group variables based on the calculated gradient at operation S360 and ends the learning of the recurrent neural network artificial intelligence model.

Figure 4:
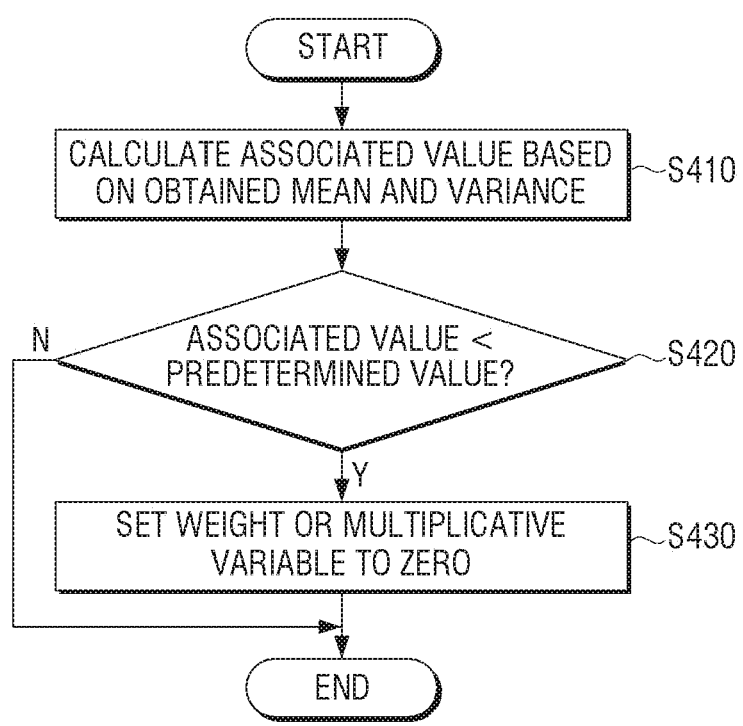
FIG. 4 is a flowchart illustrating a method for performing sparsification for a recurrent neural network artificial intelligence model according to an embodiment of the disclosure.

FIG. 4 is a flowchart illustrating a method for performing sparsification for a recurrent neural network artificial intelligence model according to an embodiment of the disclosure.

The electronic apparatus 100 calculates an associated value based on the obtained mean and variance at operation S410. The associated value means a ratio of square of mean to variance, and may be expressed as $$\frac{\theta_{ij}^2}{\sigma_{ij}^2}.$$

If the associated value is smaller than a predetermined value (Yes in operation S420), the electronic apparatus 100 performs sparsification of the recurrent neural network artificial intelligence model by setting a weight or a multiplicative variable in which an associated value is smaller than the predetermined value to zero at operation S430. The electronic apparatus 100 does not perform the sparsification for a weight or a multiplicative variable in which an associated value is greater than the predetermined value (No in operation S420), and ends the processing.

The predetermined value may be 0.05, but is not limited thereto.

Figure 5:
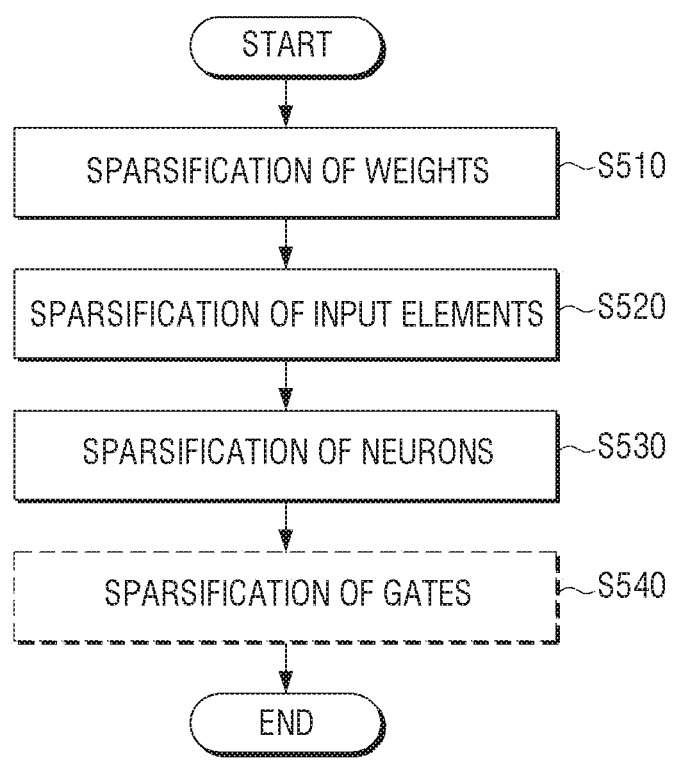
FIG. 5 is a flowchart illustrating a method for compressing a recurrent neural network artificial intelligence model according to an embodiment of the disclosure.

FIG. 5 is a flowchart illustrating a method for compressing a recurrent neural network artificial intelligence model according to another embodiment of the disclosure.

The electronic apparatus 100 may perform sparsification for weights of the recurrent neural network artificial intelligence model at operation S510. Specifically, the electronic apparatus 100 learns the recurrent neural network based on the weights to obtain a mean and a variance for the weights, calculates a ratio of square of mean to variance based on the obtained mean and variance, and sets a weight in which the calculated ratio is smaller than a predetermined value to zero.

In addition, the electronic apparatus 100 may perform sparsification for input elements of the recurrent neural network artificial intelligence model at operation S520 at operation). Specifically, the electronic apparatus 100 obtains first multiplicative variables for the input elements, learns the recurrent neural network based on the first multiplicative variables to obtain a mean and a variance for the first multiplicative variables, calculates a ratio of square of mean to variance based on the obtained mean and variance, and sets a first multiplicative variable in which the calculated ratio is smaller than a predetermined value to zero.

In addition, the electronic apparatus 100 may perform sparsification for neurons of the recurrent neural network artificial intelligence model at operation S530. Specifically, the electronic apparatus 100 obtains second multiplicative variables for an input neuron and a hidden neuron, learns the recurrent neural network based on the second multiplicative variables to obtain a mean and a variance for the second multiplicative variables, calculates a ratio of square of mean to variance based on the obtained mean and variance, and sets a second multiplicative variable in which the calculated ratio is smaller than a predetermined value to zero.

If the recurrent neural network artificial intelligence model further includes a gated structure, the electronic apparatus 100 may perform sparsification for gates of the recurrent neural network artificial intelligence model at operation S540. Specifically, the electronic apparatus 100 obtains third multiplicative variables for preactivation of the gates, learns the recurrent neural network based on the third multiplicative variables to obtain a mean and a variance for the third multiplicative variables, calculates a ratio of square of mean to variance based on the obtained mean and variance, and sets a third multiplicative variable in which the calculated ratio is smaller than a predetermined value to zero.

Meanwhile, the diverse embodiments of the disclosure may be implemented by software including instructions that are stored in machine (e.g., a computer)-readable storage media. The machine is an apparatus that invokes the stored instructions from the storage medium and is operable according to the invoked instruction, and may include the electronic apparatus (e.g., the electronic apparatus A) according to the disclosed embodiments. If the instructions are executed by the processor, the processor may perform functions corresponding to the instructions, either directly or by using other components under the control of the processor. The instructions may include codes generated or executed by a compiler or an interpreter. The machine-readable storage media may be provided in the form of non-transitory storage media. Here, the terms 'non-transitory' means that the storage media does not include a signal and is tangible, but does not distinguish whether data is stored semi-permanently or temporarily in the storage media.

In addition, according to an embodiment of the disclosure, the method according to the diverse embodiments described above may be included and provided in a computer program product. The computer program product may be traded as a product between a seller and a purchaser. The computer program product may be distributed in the form of a storage medium (for example, a compact disc read only memory (CD-ROM)) that may be read by a device, or online through an application store (for example, PlayStore™). In case of the online distribution, at least a portion of the computer program product may be at least temporarily stored in a storage medium such as a memory of a server of a manufacturer, a server of an application store, or a relay server, or be temporarily generated.

In addition, each of the components (e.g., modules or programs) according to the diverse embodiments may include a single entity or a plurality of entities, and some sub-components of the sub-components described above may be omitted, or other sub-components may be further included in the diverse embodiments. Alternatively or additionally, some components (e.g., modules or programs) may be integrated into one entity to perform the same or similar functions performed by the respective components prior to the integration. The operations performed by the module, the program, or other component, in accordance with the diverse embodiments may be performed in a sequential, parallel, iterative, or heuristic manner, or at least some operations may be executed in a different order or omitted, or other operations may be added.

Although the embodiments of the disclosure have been illustrated and described hereinabove, the disclosure is not limited to the abovementioned specific embodiments, but may be variously modified by those skilled in the art to which the disclosure pertains without departing from the gist of the disclosure as disclosed in the accompanying claims. These modifications should also be understood to fall within the scope and spirit of the disclosure.

REFERENCED PUBLICATIONS

[1] Amodei, Dario, Ananthanarayanan, Sundaram, Anubhai, Rishita, and et al. Deep speech 2: End-to-end speech recognition in english and mandarin. In Proceedings of The 33rd International Conference on Machine Learning, 2016.

[2] Wei Wen, Yuxiong He, SamyamRajbhandari, Minjia Zhang, Wenhan Wang, Fang Liu, Bin Hu, Yiran Chen, and Hai Li. 2018. Learning intrinsic sparse structures within long short-term memory. In International Conference on Learning Representations.

[3] Chan, William, Jaitly, Navdeep, Le, Quoc V., and Vinyals, Oriol. Listen, attend and spell: A neural network for large vocabulary conversational speech recognition. In ICASSP, 2016.

[4] Christos Louizos, Karen Ullrich, Max Welling. Bayesian compression for deep learning. In arXiv preprint arXiv: 1705.08665, 2017.

[5] Meire Fortunato, Charles Blundell, and Oriol Vinyals. 2017. Bayesian recurrent neural networks. Computing Research Repository, arXiv:1704.02798.

[6] Gal, Yarin and Ghahramani, Zoubin. Dropout as a bayesianapproximation: Representing model uncertainty in deep learning. In Proceedings of the 33rd International Conference on International Conference on Machine Learning, 2016.

[7] Gal, Yarin and Ghahramani, Zoubin. A theoretically grounded application of dropout in recurrent neural networks. In Advances in Neural Information Processing Systems 29 (NIPS), 2016.

[8] Ha, David, Dai, Andrew, and Le, Quoc V. Hypernetworks. In Proceedings of the International Conference on Learning Representations (ICLR), 2017.

[9] Andrew L. Maas, Raymond E. Daly, Peter T. Pham, Dan Huang, Andrew Y. Ng, and Christopher Potts. 2011. Learning word vectors for sentiment analysis. In Proceedings of the 49th Annual Meeting of the Association for Computational Linguistics: Human Language Technologies—Volume 1, HLT '11, pp. 142-150, Stroudsburg, Pa., USA. Association for Computational Linguistics.

[10] X. Zhang, J. Zhao, and Y. LeCun. 2015. Character-level convolutional networks for text classification. In Advances in Neural Information Processing Systems 28: Annual Conference on Neural Information Processing Systems (NIPS).

[11] Kingma, Diederik P. and Ba, Jimmy. Adam: A method for stochastic optimization. In Proceedings of the 3rd International Conference for Learning Representations, 2015.

[12] Kingma, Diederik P. and Welling, Max. Auto-encoding variationalbayes. CoRR, abs/1312.6114, 2013.

[13] Kingma, Diederik P., Salimans, Tim, and Welling, Max. Variational dropout and the local reparameterization trick. CoRR, abs/1506.02557, 2015.

[14] Kirill Neklyudov, Dmitry Molchanov, ArseniiAshukha, Dmitry Vetrov. Structured bayesian pruning via log-normal multiplicative noise. In arXiv preprint arXiv: 1705.07283, 2017.

[15] Tomas Mikolov, Ilya Sutskever, Kai Chen, Greg S Corrado, and Jeff Dean. 2013. Distributed representations of words and phrases and their compositionality. In Advances in Neural Information Processing Systems 26, pp. 3111-3119.

[16] Le, Quoc V., Jaitly, Navdeep, and Hinton, Geoffrey E. A simple way to initialize recurrent networks of rectified linear units. CoRR, abs/1504.00941, 2015.

[17] Jeffrey Pennington, Richard Socher, and Christopher D Manning. 2014. Glove: Global vectors for word representation. In Proceedings of the Conference on Empirical Methods in Natural Language Processing, vol. 14, pp. 1532-1543.

[18] Molchanov, Dmitry, Ashukha, Arsenii, and Vetrov, Dmitry. Variational dropout sparsifies deep neural networks. In Proceedings of the 34th International Conference on Machine Learning, ICML 2017, 2017.

[19] Mitchell P. Marcus, Mary Ann Marcinkiewicz, and Beatrice Santorini. 1993. Building a large annotated corpus of English: The penn treebank. Comput. Linguist., 19(2):313-330.

[20] Narang, Sharan, Diamos, Gregory F., Sengupta, Shubho, and Elsen, Erich. Exploring sparsity in recurrent neural networks. CoRR, abs/1704.05119, 2017.

[21] T. Mikolov, S. Kombrink, L. Burget, J. Cernocky, and S. Khudanpur. 2011. Extensions of recurrent neural network language model. In 2011 IEEE International Conference on Acoustics, Speech and Signal Processing (ICASSP), pp. 5528-5531.

[22] Xavier Glorot and YoshuaBengio. 2010. Understanding the difficulty of training deep feedforward neural networks. In Proceedings of the Thirteenth International Conference on Artificial Intelligence and Statistics, volume 9 of Proceedings of secondMachine Learning Research, pp. 249-256, Chia Laguna Resort, Sardinia, Italy. Proceedings of Machine Learning Research.

[23] Ren, Mengye, Kiros, Ryan, and Zemel, Richard S. Exploring models and data for image question answering. In Advances in Neural Information Processing Systems 28: Annual Conference on Neural Information Processing Systems, 2015.

[24] Srivastava, Nitish. Improving neural networks with dropout. PhD thesis, University of Toronto, 2013.

[25] Tjandra, Andros, Sakti, Sakriani, and Nakamura, Satoshi. Compressing recurrent neural network with tensor train. CoRR, abs/1705.08052, 2017.

[26] Wang, Sida and Manning, Christopher. Fast dropout training. In Proceedings of the 30th International Conference on Machine Learning, 2013.

[27] Wu, Yonghui, Schuster, Mike, Chen, Zhifeng, and et al. Google's neural machine translation system: Bridging the gap between human and machine translation. CoRR, abs/1609.08144, 2016.

What is claimed is:

1. A method for compressing a recurrent neural network and using the compressed recurrent neural network, the method comprising:
    obtaining first multiplicative variables for input elements of the recurrent neural network;
    obtaining second multiplicative variables for an input neuron and a hidden neuron of the recurrent neural network;
    obtaining a mean and a variance for weights of the recurrent neural network, the first multiplicative variables, and the second multiplicative variables;
    performing sparsification for the recurrent neural network based on the mean and the variance; and
    performing for at least one of a text classification or a language modeling using the recurrent neural network on which the sparsification is performed,
    wherein the weights model a dependency of target variables for the input elements and are treated as random variables in the recurrent neural network,
    wherein the recurrent neural network is trained based on a prior distribution and a posterior distribution,
    wherein the posterior distribution is approximated by a parametric distribution,
    wherein an optimal parameter for the parametric distribution being found by maximization of a variational lower bound, and
    wherein in case that a noise obtained, the posterior distribution is obtained by applying multiplicative or additive normal noise to the weights.

2. The method as claimed in claim 1, wherein the performing of the sparsification includes:
    calculating an associated value for performing the sparsification based on the mean and the variance for weights of the recurrent neural network, the first multiplicative variables, and the second multiplicative variables; and
    setting a weight, a first multiplicative variable, or a second multiplicative variable in which the associated value is smaller than a predetermined value to zero.

3. The method as claimed in claim 1, further comprising:
    based on the recurrent neural network being included a gated structure, obtaining third multiplicative variables for preactivation of gates to make gates and information flow elements of a recurrent layer of the recurrent neural network constant,
    wherein the obtaining of the mean and the variance includes obtaining a mean and a variance for the weights of the recurrent neural network, the first multiplicative variables, the second multiplicative variables, and the third multiplicative variables.

4. The method as claimed in claim 1, wherein the obtaining of the mean and the variance includes:
    initializing the mean and the variance for the weights, a first group variable, and a second group variable; and
    obtaining a mean and a variance for the weights, the first group variable and the second group variable by optimizing objectives associated with the mean and the variance of the weights, the first group variable, and the second group variable.

5. The method as claimed in claim 1, wherein the input elements are vocabularies or words.

6. The method as claimed in claim 1, wherein one noise matrix is generated for the input elements in a mini-batch for efficiency.

7. The method as claimed in claim 1, further comprising;
    performing a group sparsity by dividing the weights into some groups and pruning these groups instead of individual weights.

8. The method as claimed in claim 2, wherein the associated value is a ratio of square of mean to variance.

9. The method as claimed in claim 2, wherein the predetermined value is 0.05.

10. The method as claimed in claim 3, wherein the gated structure is implemented by a long-short term memory (LSTM) layer.

11. The method as claimed in claim 4, wherein the obtaining of the mean and the variance further includes:
selecting a mini batch of the objectives;
generating the weights, the first group variable, and the second group variable from approximated posterior distribution;
forward passing the recurrent neural network by using the mini batch based on the generated weights, first group variable, and second group variable;
calculating the objectives and calculating gradients for the objectives; and
obtaining the mean and the variance for the weights, the first group variable, and the second group variable based on the calculated gradients.

12. The method as claimed in claim 6, wherein an input-to-hidden and hidden-to-hidden weight matrices are sampled, the variational lower bound is optimized, and the posterior distribution is obtained for the weights in the form of zero-centered δ-function, based on the mini-batch.

13. The method as claimed in claim 7, the performing the group sparsity comprising;
dividing weights corresponding to one input neuron in a fully-connected layer into some groups; and
learning the weights by adding extra multiplicative weights.

14. The method as claimed in claim 11,
wherein the weights are generated by the mini batch, and
wherein the first group variable and the second group variable are generated separately from the objectives.

15. An electronic apparatus for compressing a recurrent neural network and using the compressed recurrent neural network, the electronic apparatus comprising:
a memory to store one or more instructions; and
a processor coupled to the memory,
wherein the processor is configured to:
obtain first multiplicative variables for input elements of the recurrent neural network,
obtain second multiplicative variables for an input neuron and a hidden neuron of the recurrent neural network,
obtain a mean and a variance for weights of the recurrent neural network, the first multiplicative variables, and the second multiplicative variables,
perform sparsification for the recurrent neural network based on the mean and the variance, and
perform for at least one of a text classification or a language modeling using the recurrent neural network on which the sparsification is performed,
wherein the weights model a dependency of target variables for the input elements and are treated as random variables in the recurrent neural network,
wherein the recurrent neural network is trained based on a prior distribution and a posterior distribution,
wherein the posterior distribution is approximated by a parametric distribution,
wherein an optimal parameter for the parametric distribution being found by maximization of a variational lower bound, and
wherein in case that a noise obtained, the posterior distribution is obtained by applying multiplicative or additive normal noise to the weights.

16. The electronic apparatus as claimed in claim 15, wherein the processor is further configured to:
calculate an associated value for performing the sparsification based on the mean and the variance for weights of the recurrent neural network, the first multiplicative variables, and the second multiplicative variables; and
set a weight, a first multiplicative variable, or a second multiplicative variable in which the associated value is smaller than a predetermined value to zero to perform sparsification.

17. The electronic apparatus as claimed in claim 15, wherein, when the recurrent neural network includes a gated structure, the processor is further configured to:
obtain third multiplicative variables for preactivation of gates to make the gates and information flow elements of a recurrent layer of the recurrent neural network constant;
obtain a mean and a variance for the weights, the first multiplicative variables, the second multiplicative variables, and the third multiplicative variables; and
perform sparsification for the recurrent neural network based on the mean and the variance.

18. The electronic apparatus as claimed in claim 15, wherein the processor is further configured to:
initialize the mean and the variance for the weights, a first group variable, and a second group variable; and
obtain a mean and a variance for the weights, the first group variable and the second group variable by optimizing objectives associated with the mean and the variance of the weights, the first group variable, and the second group variable.

19. The electronic apparatus as claimed in claim 18, wherein the processor is further configured to:
select a mini batch of the objectives;
generate the weights, the first group variable, and the second group variable from approximated posterior distribution;
forward pass the recurrent neural network by using the mini batch based on the generated weights, first group variable, and second group variable;
calculate the objectives and calculate gradients for the objectives; and
obtain the mean and the variance for the weights, the first group variable, and the second group variable based on the calculated gradients.

20. The electronic apparatus as claimed in claim 19,
wherein the weights are generated by the mini batch, and
wherein the first group variable and the second group variable are generated separately from the objectives.

* * * * *